(12) United States Patent
Banerjee et al.

(10) Patent No.: US 9,898,502 B2
(45) Date of Patent: Feb. 20, 2018

(54) SYSTEM AND METHOD FOR EXECUTING A SPARQL QUERY

(71) Applicant: Tata Consultancy Services Limited, Mumbai (IN)

(72) Inventors: Snehasis Banerjee, Kolkata (IN); Debnath Mukherjee, Kolkata (IN)

(73) Assignee: Tata Consultancy Services Limited, Mumbai (IN)

( * ) Notice: Subject to any disclaimer, the term of this patent is extended or adjusted under 35 U.S.C. 154(b) by 322 days.

(21) Appl. No.: 14/793,199

(22) Filed: Jul. 7, 2015

(65) Prior Publication Data
US 2016/0026680 A1   Jan. 28, 2016

(30) Foreign Application Priority Data
Jul. 24, 2014 (IN) .......................... 2388/MUM/2014

(51) Int. Cl.
*G06F 17/30* (2006.01)

(52) U.S. Cl.
CPC .. *G06F 17/30404* (2013.01); *G06F 17/30392* (2013.01); *G06F 17/30522* (2013.01); *G06F 17/30528* (2013.01); *G06F 17/30864* (2013.01)

(58) Field of Classification Search
CPC ......... G06F 17/30404; G06F 17/30392; G06F 17/30522; G06F 17/30528; G06F 17/30864
USPC ....................................................... 707/766
See application file for complete search history.

(56) References Cited

U.S. PATENT DOCUMENTS

| | | | |
|---|---|---|---|
| 6,895,578 B1 * | 5/2005 | Kolawa ............... | G06F 11/3624 714/E11.209 |
| 8,489,649 B2 | 7/2013 | Yalamanchi et al. | |
| 9,251,238 B2 * | 2/2016 | Senart ............... | G06F 17/30592 |
| 9,805,076 B2 * | 10/2017 | Yalamanchi ...... | G06F 17/30507 |
| 2007/0006041 A1 * | 1/2007 | Brunswig ........... | G06F 11/3688 714/38.14 |

(Continued)

OTHER PUBLICATIONS

Murray C, et al., Oracle Database Semantic Technologies Developer's Guide, 11g Release 2, 2014, §7.7, (available at http://docs.oracle.com/cd/E11882_01/appdev.112/e25609/sem_jena.htm#RDFRM256.

(Continued)

*Primary Examiner* — Thanh-Ha Dang
(74) *Attorney, Agent, or Firm* — Knobbe Martens Olson & Bear LLP

(57) ABSTRACT

The present disclosure provides system and method for executing SPARQL query on a SPARQL engine. For executing the SPARQL query, a function may be instantly integrated with the SPARQL query which leads to extension of the SPARQL query. The extension may be achieved through a user friendly interface which may allow transparent integration of code (i.e., the function) in any language such as JAVA, C, C++ and the like, supporting a particular functionality. The system may integrate the code by addition of newly added code to the SPARQL library after validation. Further, the system may analyze the functionality associated with the code to optimize decision making of a user. The system may further support auto compilation and rating of the functions based on the user feedback and re-usability of the code working in a collaborative environment. Further the system may enable also enable to integrate external tools and web services.

13 Claims, 13 Drawing Sheets

(56) References Cited

U.S. PATENT DOCUMENTS

| | | | | |
|---|---|---|---|---|
| 2012/0150922 | A1* | 6/2012 | Yalamanchi | G06F 17/30507 707/812 |
| 2012/0191699 | A1* | 7/2012 | George | G06F 17/30486 707/718 |
| 2012/0278334 | A1* | 11/2012 | Abjanic | G06F 17/30557 707/741 |
| 2013/0238548 | A1* | 9/2013 | George | G06F 17/30592 707/600 |
| 2013/0297660 | A1* | 11/2013 | Yalamanchi | G06F 17/30507 707/812 |
| 2014/0082329 | A1* | 3/2014 | Ghose | G06F 9/3877 712/208 |
| 2014/0149446 | A1* | 5/2014 | Kuchmann-Beauger | G06F 17/30389 707/763 |
| 2014/0172780 | A1* | 6/2014 | Senart | G06F 17/30592 707/605 |
| 2014/0189662 | A1* | 7/2014 | Mameri | G06F 8/427 717/140 |
| 2015/0178353 | A1* | 6/2015 | Hubauer | G06F 17/30516 707/771 |
| 2016/0026677 | A1* | 1/2016 | Feo | G06F 17/30389 707/718 |

OTHER PUBLICATIONS

He, X, "Integrating SciSPARQL and MATLAB", Uppsala University, Department of Information Technology, Mar. 2014, pp. 1-33 (available at http://www.it.uu.se/research/group/udbl/Theses/XuemingHeMSc.pdf).

* cited by examiner

Management Centre – Function Types

| Standard Functions | StandardDeviation ▼ | View Code | Suggest | | | |
|---|---|---|---|---|---|---|
| Defined Functions | IsNorthWestOf ▼ | View Code | Update | Remove | Search | North |
| | | | | | | IsNorthOf |
| | | | | | | IsWestOf |
| Shared Functions | IsNorthOf ▼ | View Code | Suggest | | | |
| | IsNorthOf | | | | | |
| | IsSouthOf | | | | | |
| | IsEastOf | | | | | |
| | IsWestOf | | | | | |

Figure 5

Some ways to represent isNorthWestOf(location1, location2) (a) as the 90 degree area between N-W (b) as the 45 degree diagonal area between N-W (c) as a line with some width 'w' which is at 45 degree NW Validation module platform The platform allows chaining of existing functions with new ones with re-usability —Chaining concept in connected approach in form of modules — Collaborative development ecosystem

SYSTEM AND METHOD FOR EXECUTING A SPARQL QUERY

CROSS-REFERENCE TO RELATED APPLICATIONS

The present application claims priority to Indian Provisional Patent Application No. 2388/MUM/2014, filed on Jul. 24, 2014, the entirety of which is hereby incorporated by reference.

TECHNICAL FIELD

The present disclosure described herein, in general, relates to semantic web and information systems and more particularly to a system and method for executing a Simple Protocol and RDF Query Language (SPARQL) query on a SPARQL engine.

BACKGROUND

Semantic web is an initiative of World Wide Web Consortium (W3C) to make information on the web readable not only by humans but also by machines. Resource Description Framework (RDF) is a model for a semantic web data and Simple Protocol and RDF Query Language (SPARQL) is standard query language for the RDF. The SPARQL is used to query the semantic web data enabling querying from multiple websites, enterprise databases, and the RDF databases. Since the SPARQL uses a standard, the SPARQL facilitates in querying widely disparate web technologies. Furthermore, the RDF database has several distinctive features as compared to traditional structure databases. With city administration and private entities gradually releasing various data in a structured form namely the RDF format a large number of applications and services have started to emerge that utilize integration and analysis of the semantic data for the benefit of business, administration and citizens.

With a wide variety of the RDF data available, the number of rich SPARQL queries possible is humongous. Currently available techniques facilitate the SPARQL queries to accommodate graph pattern matching. However, these current techniques lacks in addressing an issue of expressing a complex logic in form of the SPARQL queries that require computations apart from the graph pattern matching. In an example, to compute 'co-prime' logic has to be written in SPARQL syntax each time a query needs a calculation of mutual prime, though there is a need to make this available by default. Current systems require implementation expertise for extension of SPARQL grammar. Therefore, it is observed that the current SPARQL based systems does not support extension of useful functions without having the knowledge of the implementation and integration details associated with the SPARQL and hence may not be extendable easily.

SUMMARY

This summary is provided to introduce aspects related to systems and methods for executing a Simple Protocol and RDF Query Language (SPARQL) query on a SPARQL engine and the concepts are further described below in the detailed description. This summary is not intended to identify essential features of subject matter nor is it intended for use in determining or limiting the scope of the subject matter.

In one implementation, a system for executing a Simple Protocol and RDF Query Language (SPARQL) query on a SPARQL engine is disclosed. The system may comprise a processor and a memory coupled to the processor. The processor may execute a set of instructions stored in the memory to receive a SPARQL query from a user. Further, the SPARQL query may be linked with a specific requirement of the user. Further, processor may execute the set of instructions to determine whether a function is present in a SPARQL function library that meets the specific requirements of the user. The processor may further execute the set of instructions to enable the user to select at least one of a user-defined function and an external function when the function is not present in the SPARQL function library. The user-defined function and the external function may correspond to a programming language other than a SPARQL query language. Further, the at least one of the user-defined function and the external function may be instantly integrated into the SPARQL function library. The processor may further execute the set of instructions to execute the SPARQL query, on a SPARQL engine, using either the function present in the SPARQL library function, or the least one of the user-defined function or the external function.

In another implementation, a method for executing a Simple Protocol and RDF Query Language (SPARQL) query on a SPARQL engine is disclosed. The method may comprise receiving, by a processor, a SPARQL query from a user. Further, the SPARQL query may be linked with a specific requirement of the user. The method may further comprise a step of determining, by the processor, whether a function is present in a SPARQL function library that meets the specific requirements of the user. Further, the method may comprise the step of enabling, by the processor, the user to select at least one of a user-defined function and an external function when the function is not present in the SPARQL function library. The user-defined function and the external function may correspond to a programming language other than a SPARQL query language. Further, the at least one of the user-defined function and the external function may be instantly integrated into the SPARQL function library. The method may further comprise a step of executing, by the processor, the SPARQL query on a SPARQL engine. Further, the SPARQL query is executed using either the function present in the SPARQL library function, or the least one of the user-defined function or the external function.

In yet another implementation, a non-transitory computer readable medium embodying a program executable in a computing device for executing a Simple Protocol and RDF Query Language (SPARQL) query on a SPARQL engine. The program may comprise a program code for receiving a SPARQL query from a user. Further, the SPARQL query may be linked with a specific requirement of the user. Further, the program may comprise a program code for determining whether a function is present in a SPARQL function library that meets the specific requirements of the user. The program may further comprise a program code for enabling the user to select at least one of a user-defined function and an external function when the function is not present in the SPARQL function library. The user-defined function and the external function may correspond to a programming language other than a SPARQL query language. Further, the at least one of the user-defined function and the external function may be instantly integrated into the SPARQL function library. The program may further comprise a program code for executing the SPARQL query on a SPARQL engine. The SPARQL query may be executed using either the function present in the SPARQL library function, or the least one of the user-defined function or the external function.

BRIEF DESCRIPTION OF THE DRAWINGS

The foregoing detailed description of embodiments is better understood when read in conjunction with the appended drawings. For the purpose of illustrating the disclosure, there is shown in the present document example constructions of the disclosure; however, the disclosure is not limited to the specific methods and apparatus disclosed in the document and the drawings.

The detailed description is described with reference to the accompanying figures. In the figures, the left-most digit(s) of a reference number identifies the figure in which the reference number first appears. The same numbers are used throughout the drawings to refer like features and components.

FIG. 5 illustrates different function types with available options, in accordance with an embodiment of the present disclosure.

DETAILED DESCRIPTION

Systems and methods for executing a Simple Protocol and RDF Query Language (SPARQL) query on a SPARQL engine are described in detail. The present disclosure facilitates dynamic or on-the-fly extension of a SPARQL function library using a collaborative platform. Further, the present disclosure may be enabled to support an ordinary user to add one or more functions to the SPARQL function library built in a SPARQL engine. The ordinary user may be a person who is unaware of coding practices, internal functionality of the SPARQL engine, and further he may belong to a non-computer background.

In one aspect, the present disclosure may be enabled to allow integration of a software code retrieved from internet or other sources which may be in different programming languages including, but not limited to, Java, C, C++, and the like. The system may be capable to understand input language and accordingly integrate the software code in the SPARQL engine. Moreover, the present disclosure may enable the user to define one or more functions to be shared, rated, extended on the collaborative platform, enriching the SPARQL library built in the SPARQL engine. Further, the system also enables the user to search one or more functions already present in the SPARQL function library as well as user defined functions and shared functions that are ready to use. Further, the function input by the user may be validated by the system. Additionally, the present disclosure enables chaining of a plurality of functions for the purpose of defining a new function.

Further, the present disclosure may be enabled to support analytics on the plurality of functions. The plurality of functions stored in the SPARQL function library built in the SPARQL engine may be analyzed for time and space requirements, frequency of usage, modification, extension and other details. Based on analytics performed over the plurality of functions, the system may allow the users to select an appropriate function. According to embodiments of present disclosure, the system may further provide integration of external tools and web services for facilitating extension of functionalities of the SPARQL queries.

Figure 1:
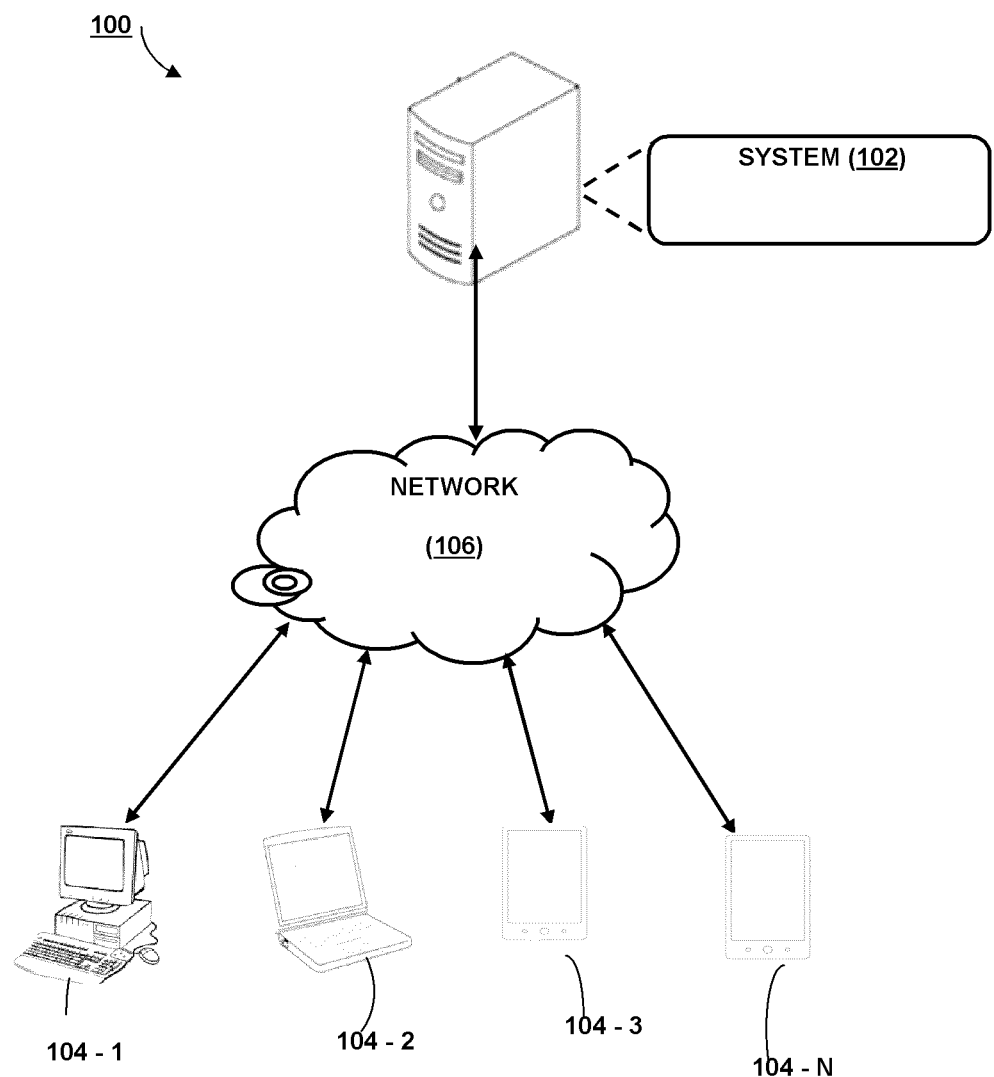
FIG. 1 illustrates network implementation of the system, in accordance with an embodiment of the present disclosure.

While aspects of described system and method for executing a Simple Protocol and RDF Query Language (SPARQL) query on a SPARQL engine may be implemented in any number of different computing devices, environments, and/or configurations, the embodiments are described in the context of the following exemplary system Referring to FIG. 1, a network implementation 100 of a system 102 for executing a SPARQL query on a SPARQL engine is illustrated, in accordance with an embodiment of the present subject matter. Although the present subject matter is explained considering that the system 102 is implemented as a software application on a server as a collaborative platform, it may be understood that the system 102 may also be implemented in a variety of computing systems, such as a laptop computer, a desktop computer, a notebook, a workstation, a mainframe computer, a server, a network server, a cloud-based computing environment and the like. In one implementation, the system 102 may be implemented in a cloud-based environment. It will be understood that the system 102 may be accessed by multiple users through one or more user devices 104-1, 104-2 . . . 104-N, collectively referred to as user devices 104 hereinafter, or applications residing on the user devices 104. Examples of the user devices 104 may include, but are not limited to, a portable computer, a personal digital assistant, a handheld device, and a workstation.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
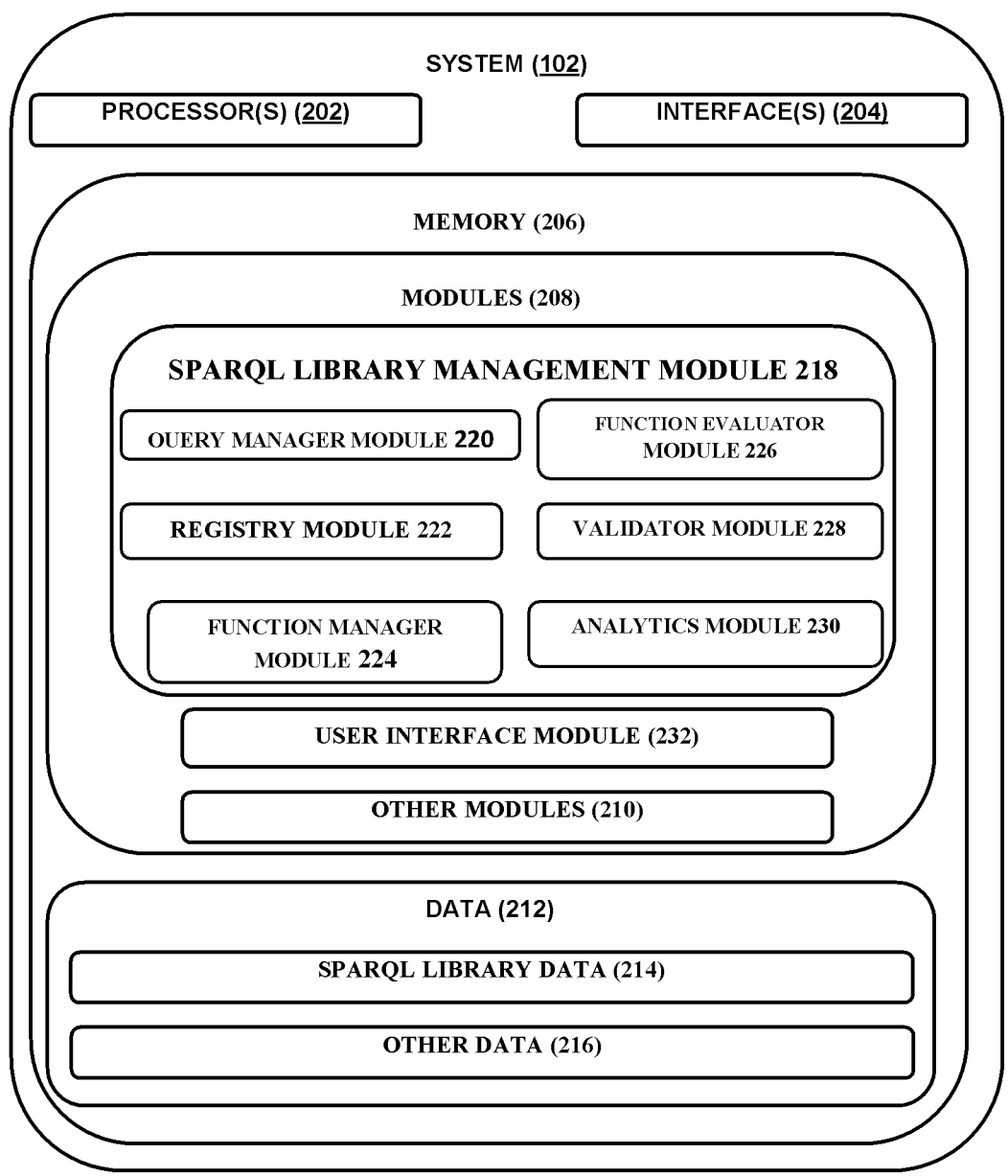
FIG. 2 illustrates working of various modules of the system, in accordance with an embodiment of the present disclosure.

Referring now to FIG. 2, the system 102 is illustrated in accordance with an embodiment of the present disclosure. In one embodiment, the system 102 may include a processor 202, an input/output (I/O) interface 204, and a memory 206. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium and computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208, other modules 210 and data 212.

The modules 208 include routines, programs, objects, components, data structures, etc., which perform particular tasks or implement particular abstract data types. In one implementation, the modules 208 may include a SPARQL library management module 218 and a user interface (UI) module 232. The SPARQL library management module 218 may further comprise a query manager module 220, a registry module 222, a function manager module 224, a function evaluator module 226, a validator module 228, and an analytics module 230. The other modules 210 may include programs or coded instructions that supplement applications and functions of the system 102. In one embodiment, the modules 208 described herein may be implemented as software modules that may be executed in the cloud-based computing environment of the system 102.

The data 212, amongst other things, serves as a repository for storing data processed, received, and generated by one or more of the modules 208. The data 212 may also include the SPARQL library data 214, and other data 216. The other data 216 may include data generated as a result of the execution of one or more modules in the other modules 210.

Figure 3:
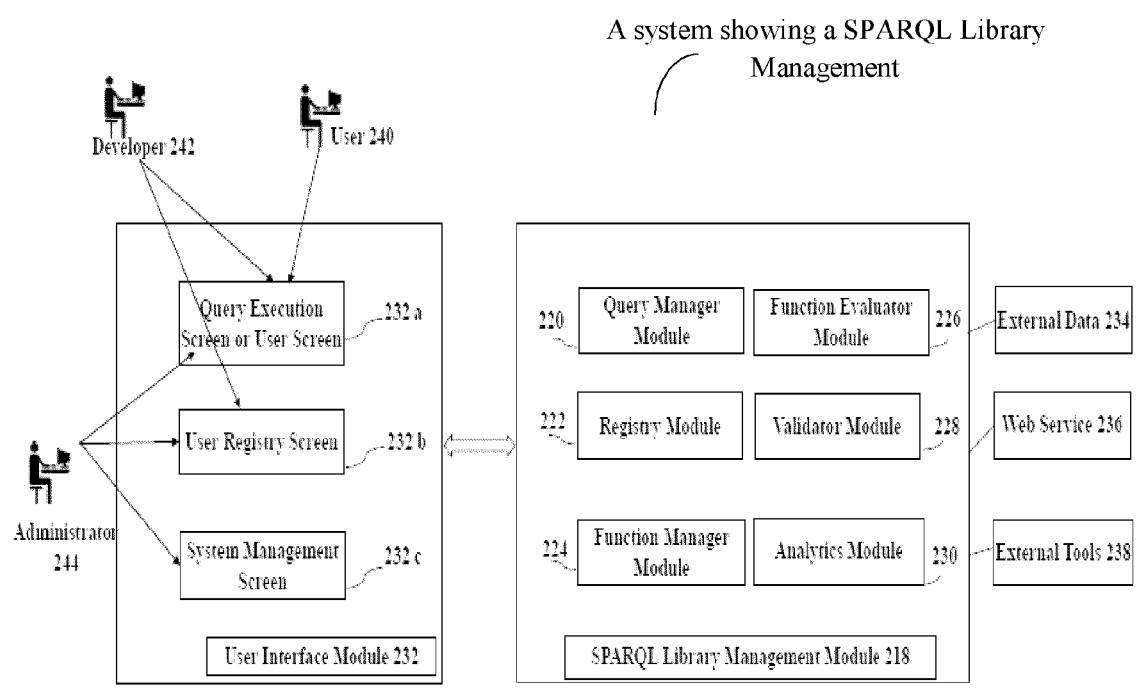
FIG. 3 illustrates various components of the system, in accordance with an embodiment of the present disclosure.

Referring to FIG. 3, the system 102 may comprise the SPARQL library management module 218. The SPARQL library management module 218 may further comprise various modules such as the query manager module 220, the registry module 222, the function manager module 224, the function evaluator module 226, the validator module 228, and the analytics module 230. The SPARQL library management module 218 may interface with the user interface (UI) module 232 having three screens like query execution screen 232a, user registry screen 232b and system management screen 232c. The system 102 may also have an interface with an external data 234, web services 236, and external tools 238. The external data 234 may further include a RDF data store and semantic web. The web services 236 may further include services like earth distance computation services, and online computational engines. The external tools 238 may also include statistical tools and data processing tools. The user 240 may have access to the query execution screen 232a, while the developer 242 may have access to the query execution screen 232a and the user registry screen 232b as well. The administrator 244 may have access to all three UI screens including the system management screen 232c. Further, the user 240, the developer, 242 and the administrator 244 may access the system 102 through the user devices 104.

In another aspect of the present disclosure, the system 102 may comprise a search interface available in all the UI screens of the UI module 232, where the user 240 may search for ready to use functions and corresponding metadata of the functions. The metadata may provide description, ratings and analytics of the functions. The search interface may facilitate in selection of apt function, by the user 240 trying to query, for computation. Also while adding the function to the SPARQL library management module 218, the user 240 may be enabled to check whether the function already exists or not, and if yes, the user 240 may be enabled to check whether the function is fine or whether a separate function of similar functionality should be added to meet the user's requirement. Further, in another embodiment, the developer 242 and the administrator 244 may also access the search interface of the UI module 232.

Now referring to the UI module 232, the query execution screen 232a may serve as an interface for adding the functions directly to the user registry screen 232b. Further, the functions may be visualized being executed on the query execution screen 232a. The user registry screen 232b may accessible to the developer 242 in order to view metadata of the functions, the metadata comprising function id, rating, time and space coordinates, associated developer, and last modified, and the like.

In another aspect, the user 240 may be enabled to perform few tasks on the user registry screen 232b such as a) updating/adding/removing the functions, b) sharing the functions with all the users or a group or keeping the functions private, c) viewing the source code or other implementation details of the shared functions with apt permissions, d) commenting, rating and providing suggestions for different registry functions, e) tagging self-created functions with meaningful meta-data and description, f) in particular session, the user may turn on and off certain functions, which helps in minimizing load of system 102. This is because, the turned off functions may not remain loaded in the system 102 and may be loaded on demand any time. Further, turned on functions may be kept loaded in the system 102.

The system management screen 232c may be enabled to visualize the analytics performed on the user registry module 232b. The analytics may further help in optimizing decision making ability based on the analytics performed. In one example, a frequently used function may be suggested to the standard body for inclusion in the library of SPARQL standard functions.

Further, the system management screen 232c may be accessible to the administrator 244, wherein the administrator 244 may be enabled to add the interfaces for the external data 234, the web services 236, and the external tools 238. Hence, integration with the external tools 238 and the web services 236 for the functionality extension may be supported. The administrator 244 may be further enabled to visualize results of the analytics performed, whereas the user 240 may also be enabled to view some portions of the analytics. In an aspect of present disclosure, the administrator 244 of the system 102 may be enabled to perform following tasks using the system management screen 232c.

a) Managing the Registry—creating/updating/removing apt web service API and external tool APIs,
b) Visualization of system metrics—to gain the system insights and convey the same to apt channel, and
c) Deleting malicious users and the functions based on the analytics.

Referring to the FIG. 3, the SPARQL library management module 218 may further comprise of the query manager module 220 which hosts the SPARQL engine. The query manager 220 may integrate output of custom queries to the SPARQL engine and enables querying using the SPARQL. The query manager module 220 may run the custom query using the defined functions or the linked functions. Further, the query manager module 220 may supply needed information like the functions used and runtime complexities to the analytics module 230. The registry module 222 may store metadata, of the functions, comprising function id, rating, time and space coordinates, associated developer, and last modified. Addition of the function may be done using the user registry screen 232b of the UI module 232 in a structured way.

In an aspect of the present disclosure, the function manager module 224 may interface different functions added to the registry module 222 with the SPARQL engine. The function evaluator module 226 may provide the runtime environment for execution of the functions written in any language. For the code written in JAVA language, a JAVA runtime environment may be provided, while for non-JAVA code, a JAVA native interface may be provided for compilation of the code provided the system is implemented in Java. The system 102 may have flexibility of allowing the user 240 to specify the input language or the system 102 may detect the language automatically based on patterns.

The SPARQL library management module 218 may comprise the validator module 228 to validate source code for syntax error, semantic errors as well as to perform black box testing with the user feedback. The user 240 may validate the output of the query results for the given input and may take corrective steps and/or actions accordingly.

Figure 11:
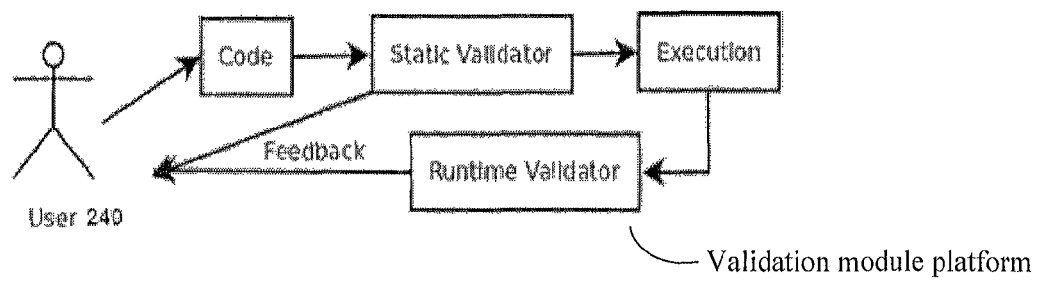
FIG. 11 illustrates the validation module platform, with feedback given to the user, in accordance with an embodiment of the present disclosure.
Figure 12:
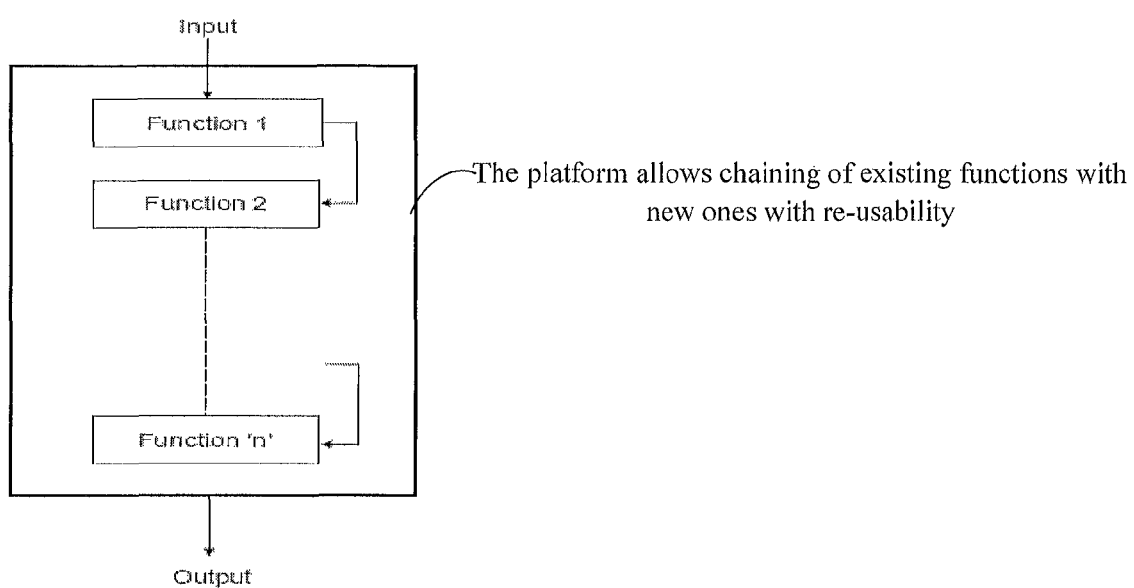
FIG. 12 illustrates the system for allowing chaining of the existing functions with new functions for re-usability, in accordance with an embodiment of the present disclosure.

Now referring to FIG. 11, in the validator module 228, a platform to test and validate the functionality of the added functions, with feedback given to the user 240 is illustrated. There may be 4 validation steps as follows:— a) Static Validation:—Includes static code analysis, checking for syntax errors and coding errors like infinite loops may be looked up.
b) Compilation Validation:—Includes checking/verifying whether the code is compiled. This usually arises from missing library functions.
c) Runtime Validator:—That may check for any runtime errors using test input from user or random input, and
d) Black Box Validator:—Where the user 240 may provide some input and the output of execution may be shown to the user 240. The user 240 may check whether the added function provided the desired output for the input.

Also, error feedbacks may be presented to the user 240 in every step.

The analytics module 230 may measure the frequency of usage of the functions, the average space and the time requirements for the SPARQL query evaluation, the frequency of usage, the modification, the extension, the analysis of the user ratings and the feedback. Inputs to the analytics module 230 may be routed from the query manager module 220. The analytics module 230 may also get relevant data from the registry module 222 and the function manager module 224.

Figure 4:
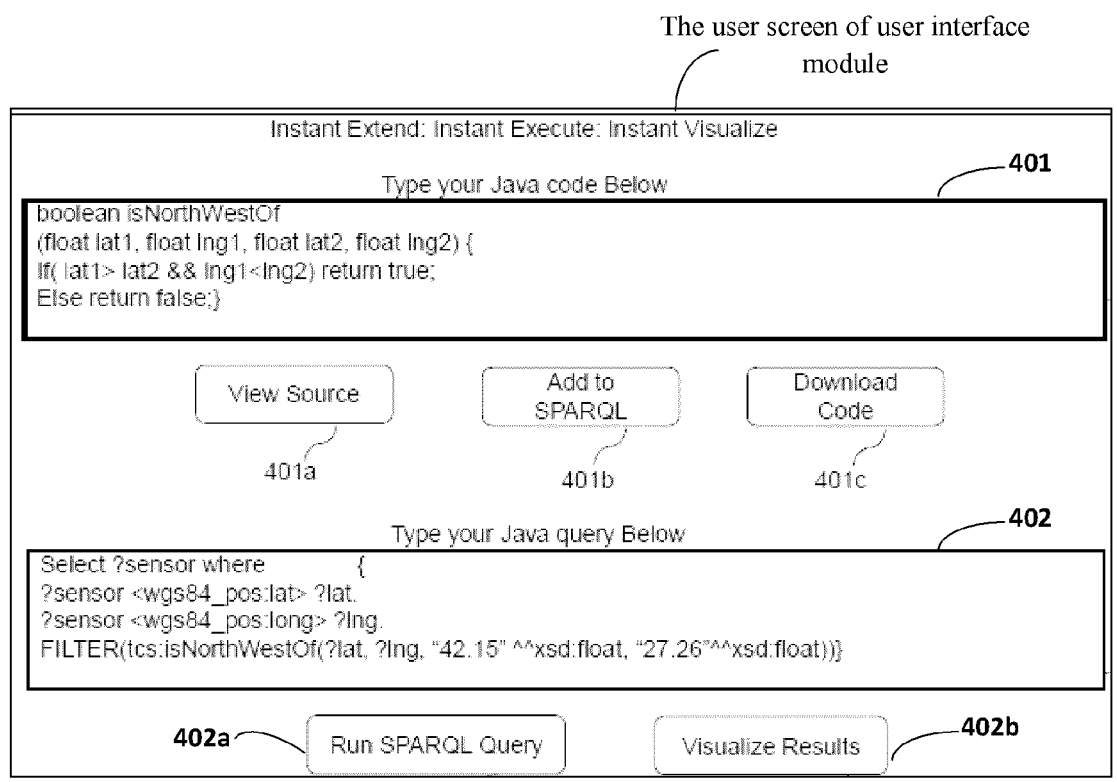
FIG. 4 illustrates user screen to add code for a function and run queries, in accordance with an embodiment of the present disclosure.

Referring to the FIG. 4, the UI module 232 is shown that enables instant extension, execution and visualization of the code (i.e., a software code). In one example, consider the code 401 may define a function "isNorthWestOf". Using view source button 401a, the user 240 may have an option to view the source of the function written in a syntax highlighted form. Also there may have an option of "Add to SPARQL" 401b through which the user 240 may add his/her code to the SPARQL library. The user 240 may need to write the code 401 of the function as shown in 401. There may be a provision to "Download Code" from the internet using 401c where the ordinary user may download the code from the internet in any language. The ordinary user may be a person who does not have any specific or special knowledge about the SPARQL queries. Further, the ordinary user may be a person who is unaware of coding practices, internal functionality of the SPARQL engine, and may belong to a non-computer background. Backend process may ensure the code 401 added on fly either from the web using 401c, or the user defined using 401b may be integrated with the SPARQL library, however only after validation, without the user intervention. The user 240 may not require having knowledge associated with the integration details, the necessary checks may be done by the function evaluator module 226. The validator module 228 may check the validity of the function and the code 401 may be converted to the SPARQL extension form and added to the registry module 222 of the SPARQL functions. The user 240 knowing the intended use of the functionality implemented in any other programming language may add the function to the SPARQL library being transparent to the implementation. The user 240 may have facility to download the validated code as well.

Figure 9:
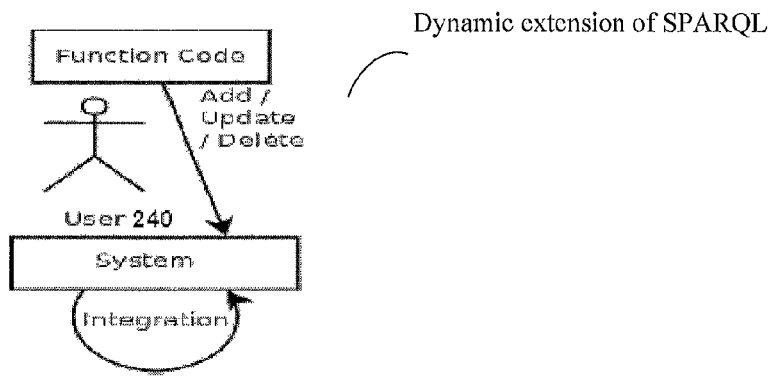
FIG. 9 illustrates dynamic extension of the SPARQL by the user without knowing implementation details, in accordance with an embodiment of the present disclosure.
Figure 10:
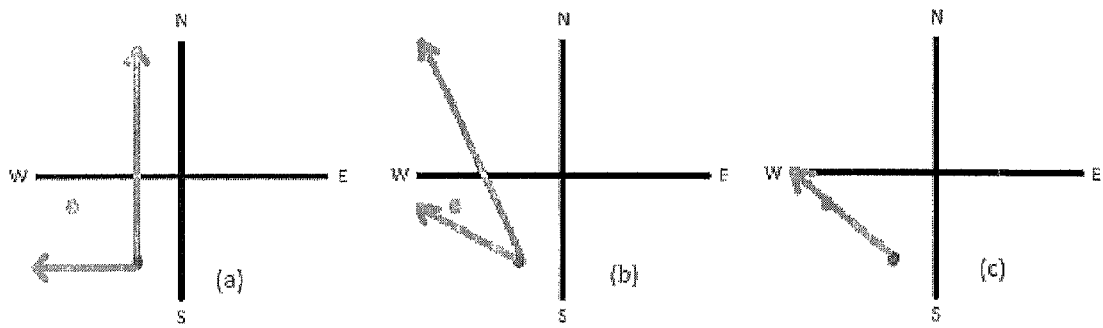
FIG. 10 illustrates with an example the need of overriding functions based on different interpretations of existing function by a particular user, in accordance with an embodiment of the present disclosure.

FIG. 9 illustrates a simple diagrammatic representation for the dynamic extension of the SPARQL function library. The user knowing other programming language, like Java, C, C++, may write the code 401 of the functionality and the same may be added to the SPARQL function library. The function code in Java or other programming languages may also be added. Once the function is defined as in the step 401, in the step 402, the SPARQL query may be written using the defined function. The user 240 may run the SPARQL query using 402*a* and visualize the results using the button 402*b*. At the same time in background auto-loading of the functions may take place. The auto-loading may be based on the following criteria:
 a) Whether the functions is turned on, and
 b) Whether the function is frequently used.

Figure 6:
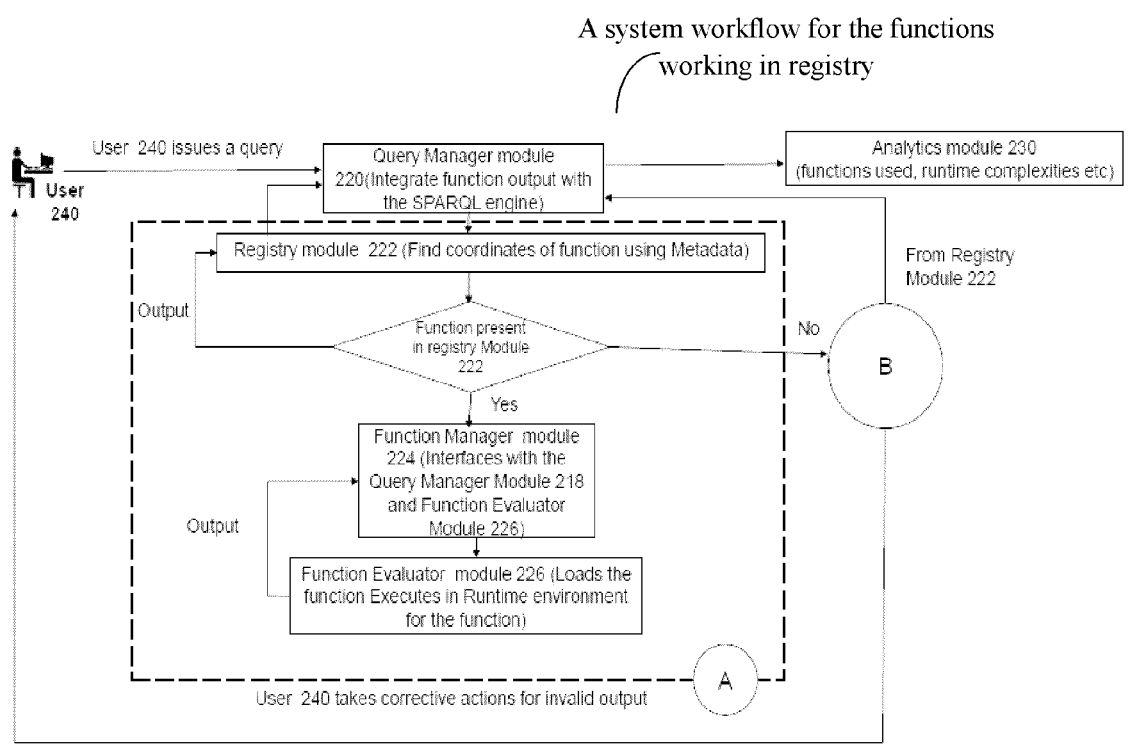
FIG. 6 illustrates the system workflow for the function existing in registry, in accordance with an embodiment of the present disclosure.

In an exemplary embodiment, a system workflow explaining the working of the SPARQL library management module 218 may be explained referring to the FIG. 6. The FIG. 6 illustrates the scenario wherein the user 240 issues a query using the function 'IsNorthWestOf' and submits to the query manager module 220 using the query execution screen 232*a*. The query manager module 220 may parse the query and may further pass control to the registry module 222 as soon as the query manager module 220 finds a function keyword. For existing function a metadata associated with function's name, function's location may be determined and the control may be passed to the function manager module 224 which hosts the functions. The function may then be loaded into the function evaluator module 226 which may execute the function in appropriate runtime environment and may further compute the output. The output may then be passed back to the query manager module 220 via the function manager module 224 for the purpose of continuing the query evaluation. The query manager module 220 may supply needed information such as the functions used, the runtime complexities to the analytics module 230. The query outputs may be shown to the user 240 via the query manager module 220.

Furthermore, if the function used in the query does not exist in the registry module 222, the query execution may fail and the error message may be shown to the user 240. In one embodiment, as in FIG. 7, the user 240 may issue a query using the function 'IsNorthWestOf' and submits to the query manager 220 using the query execution screen 232*a*. The query manager module 220 may pass the control to the registry module 222. For a newly issued function a corresponding function may not be found in the registry module 222 and may pass the control on to the function evaluator module 226. The function may be executed in the appropriate runtime environment and the output is computed. If compiled successfully, the code may be run through the validator module 228 which validates the source code for syntax error, semantic errors as well as enable the black box testing. The output from the validator module 228 may be submitted to the query manager module 220 via the function manager module 224 and the registry module 222 which integrates the output with the SPARQL engine. Furthermore, the query manager module 220 may integrate the output with the SPARQL engine and may subsequently supply needed information such as the functions used, the runtime complexities to the analytics module 230.

Figure 8:
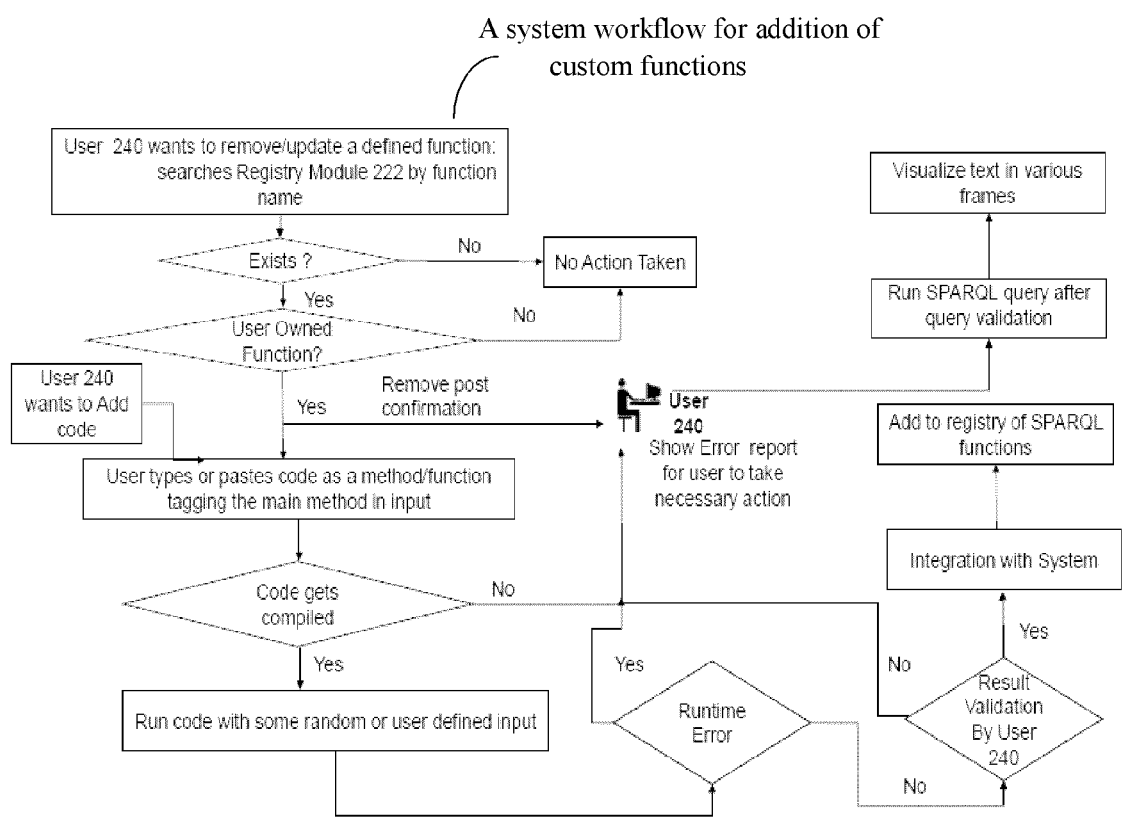
FIG. 8 illustrates the system workflow for addition of custom function search/addition/update and querying, in accordance with an embodiment of the present disclosure.

In an embodiment, the method to add/update/delete the functionality from the SPARQL is illustrated in FIG. 8. In the present embodiment, the user 240 may first check the registry module 222 for existence of the function. If the function does not exist or if the function does not belong to the user 240, the user 240 may be denied permission to edit or delete the function. Further if the user 240 wishes to add a function the user 240 may type or paste the code in a text box as a method or the function after tagging a main method in the input.

One more scenario may be explained through FIG. 8. The FIG. 8 illustrates the scenario wherein the user 240 may first search if the function exists matching the user's 240 requirement. If not, the user 240 may add the function by tagging the 'main' method in case of multiple functions associated with the main method. The code may be added to the SPARQL library for immediate use, and the same code may be shared for others to use. In case the code has compilation errors or the validation errors, the report may be shown to the user 240 who may take necessary steps to resubmit the valid code. In case of the successful compilation and the valid result the query manager module 220 may convert the output to the SPARQL extension form and the same may be added to the registry module 222 of the SPARQL functions. The user 240 may then onwards use the function in the query. On the query execution, the result may be shown to the user 240 in the appropriate form based on the meta-data of resultant data. The user 240 may have the option to manually visualize results in the apt form.

In another example, if the user 240 wants to add the function, say in this case, "isNorthWestOf" in which the system 102 may take latitude and longitude of two points and calculates whether the first point is northwest of the second point, then the user 240 may search the registry module 222 of the existing the functions. The registry module 222 may be a code base of the functions that the user 240 may use for the querying purpose. The registry module 222 may also contain the meta-data of the functions that aids the user 240 both in searching as well as knowing more details about the functions. The code base may further contain—
 a) Standard functions: some frequently used functions like standard deviation
 b) Defined functions: functions added by the user.
 c) Shared functions: functions added by other users and shared for re-usability.
 d) Web Service functions: web service APIs registered in the system.
 e) External Tool functions: external tool(s) APIs integrated with the system.

FIG. 5 shows the UI displaying the standard functions, the defined functions, and the shared functions.

Figure 7:
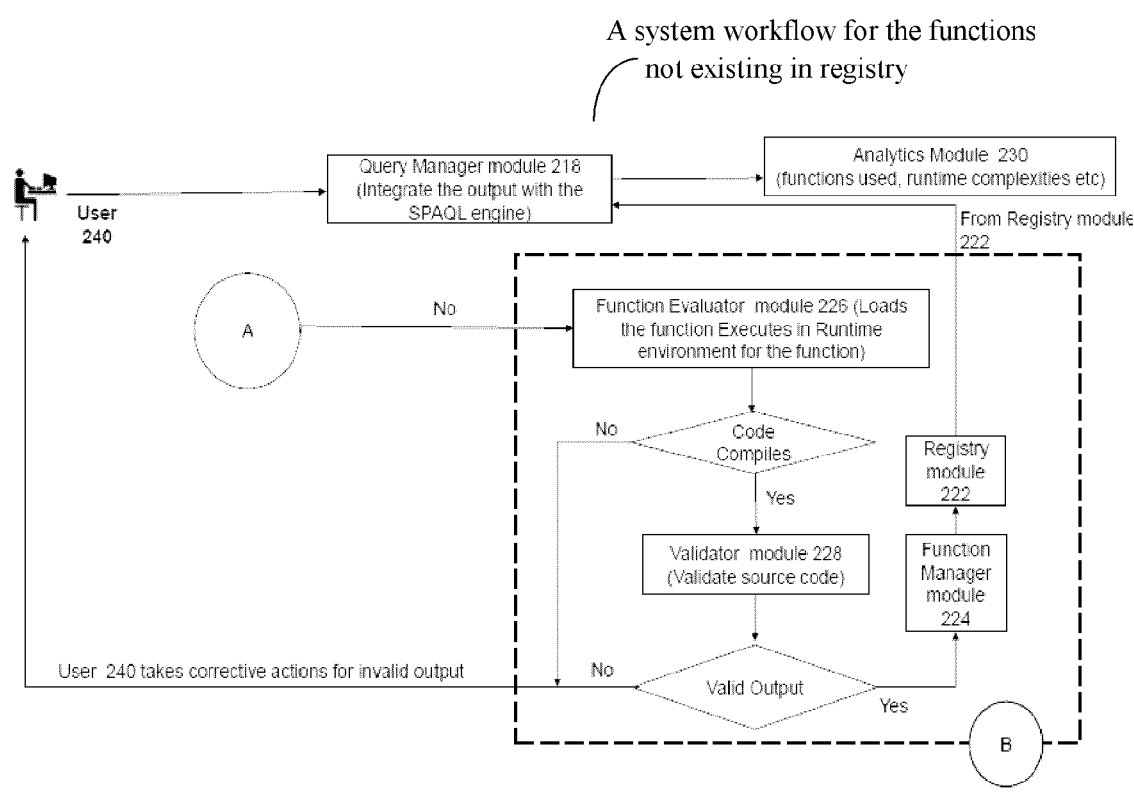
FIG. 7 illustrates the system workflow for the function not existing in the registry, in accordance with an embodiment of the present disclosure.

Additionally, in another aspect of the present disclosure, the user 240 may be allowed to remove and update self-created functions. If a desired function does not exist, the user may add that function to registry module 222. If the desired function does exist, but some logic needs to be changed for application specific requirements, the same may be done by overriding the function for the user 240. As an example of overriding, the function "isNorthWestOf" may be expressed in many ways as shown in FIG. 7 and may be used as per need. In the SPARQL, there may exist two categories of the functions such as aggregate functions and instant evaluating functions.

In an embodiment, there exists few approaches for the purpose of extending the SPARQL library which are as follows—
 a) Using modular programs
 b) Using the web services for the functional support
 c) External tool Integration
 d) A hybrid approach: combining the above two or more approaches
 e) Connected approach in form of modules Firstly, in the extension using the modular programs, the user 240 may input into the system 102 the functions that the user 240 wants to add into the function library. In case of multiple functions, the main calling method has to be tagged.

Secondly, as a large number of computational tasks may be provided as the web service, using the API calls instead of whole function implementation. This may be explained using an example, wherein instead of using the standard Haversine formula, a mathematical formula to calculate distance between 2 points on earth's surface, to calculate distance between two points, external maps API may be used, which models the earth better, for richer results.

Thirdly, in the external tool integration sometimes standard tools already exist for calculations may needed to be used. Such calculations may be offloaded to dedicated software by providing the data and getting back the result from within the SPARQL functions.

Fourthly, the hybrid approach illustrates combining the above two or more approaches. A single SPARQL query may be composed of the web service 236 call as well as external tool calls 234 apart from handier user defined function calls.

Figure 13:
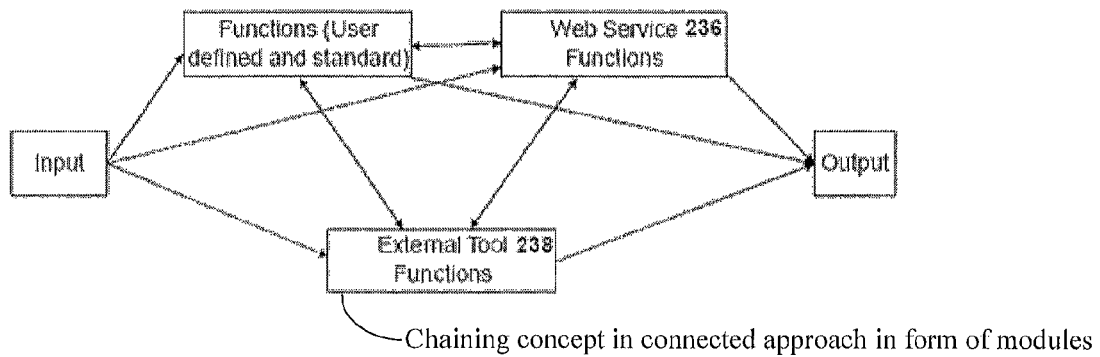
FIG. 13 illustrates the chaining concept in connected approach in form of modules, with feedback given to the user, in accordance with an embodiment of the present disclosure.

And finally, connected approach in form of the functions may be explained using FIG. 13. The FIG. 13 illustrates a work-flow chain may be created where the outputs of one function are passed as input to another function. The functions may further comprise of the user defined functions, the external tool APIs and the web service APIs. Further, a workflow like interface may be provided for combining multiple functions.

Figure 14:
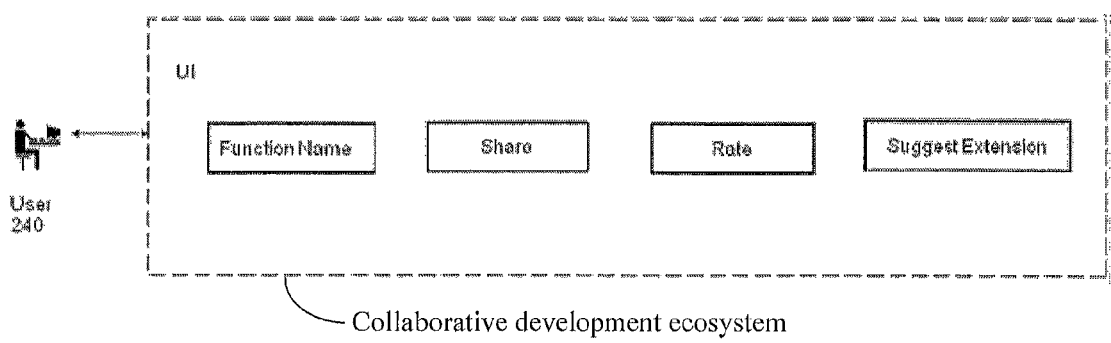
FIG. 14 illustrates a collaborative development ecosystem through which the user may share, rate and suggest extension of the functions, in accordance with an embodiment of the present disclosure.

Now referring to FIG. 14 illustrates the system and method to share, rate and extend the platform by suggesting the code, which may help in further enriching the SPARQL library and the working in the collaborative development ecosystem. An example of the extension of the function may be to use the function for other data types, say earlier the function supported operations on integers, now the functions may support some other data type like string or spatial data. The user ratings may be further used in the analytics module 230 to identify the highest rated functions. Further the SPARQL library may be enriched for poorly rated functions. Highly rated functions may be recommended to the SPARQL standard body for default inclusion in the SPARQL engine.

The system 102 may be explained in detail through an exemplary embodiment illustrating each step performed in the system 102. The example used is that of a system named Sensor Explorer, which allows searching sensor information. The present example may be explained to showcase the proposed functionality, wherein sensors may be attached with a location, so Geo-SPARQL, a SPARQL extension in the geospatial domain may play a major role in supporting spatial queries. However, the Geo-SPARQL specification by Open Geospatial Consortium (OGC) may lack some features which may be required to satisfy many useful Sensor Explorer queries, thereby making extension a necessity.

The present exemplary embodiment may be explained for extending the SPARQL for the Sensor Explorer as explained above. The sensor data associated with the queries in the Sensor Explorer is of 2 types:

a) Query on sensor meta-data, like age of a sensor; and
b) Query on sensor data or readings, like humidity level.

The Geo-SPARQL is chosen as a standard for the sensor data exploration. However, in the spatial domain, the Geo-SPARQL specification may not handle orientation aspect at all, however may partially handle proximity and containment and may miss on some other aspects as mentioned below.

a) Orientation:—The basic features in geocentric reference system missing from the specification are: a) North b) East c) West d) South, and by combining the aspect of angle between two entities may have a set of the function such as 'isNorthOf', 'isNorthWestOf', 'isParallelToEquator', 'isNorthWestOfAtAngle(x)' and so on. For the geocentric and external reference system, Oriented Point Relation Algebra may be one of the ways to represent qualitative relations. The list of the functions include 'isFrontOf', 'isBackOf', 'isLeftOf', 'isRightOf', relative angles and combinations thereof. Some other functions may include 'isAbove' and 'isBelow' in case of 3-D (three dimensional spaces). A simple query is to find the average temperature to the north of a specified zone.

b) Proximity may be the calculation of distance between two points and may be quantitative like within 10 km as well as qualitative like 'near' and ' far', the latter being missing from the Geo-SPARQL specification. Often the distance between two points may be determined by the path, as a straight line journey is infeasible, which may lead to functions like ' distance-on-road', ' distance-by-flight' and the like. A simple function may be 'quickest-distance' that returns the distance in terms of best suitable travel mode, similar to map based distance calculation web APIs like the Google Maps API. In another aspect of the exemplary embodiment, sometimes the distance may be denoted in terms of time to reach a destination instead of path length, hence the functions in the category may be of the form 'reachableWithIn (x, y time units)'.

c) Containment:—One interesting function missing in the Geo-SPARQL specification is 'between' by which whether an object lies between two objects may be determined.

d) Pattern-based:—In 2-D and 3-D space, spatial objects may form patterns of the geometric functions and shapes such as if four objects form a square or not.

e) Altitude:—It is a neglected feature in the spatial extensions of the SPARQL. Usually the sensor locations may be expressed as a tuple, of the form latitude, longitude, and altitude, which makes way for the rich function set like 'higher' and 'lower'. 'Visibility' between two points may form another interesting function.

f) External API calls:—As a large number of computational tasks are provided as a web service, using API calls instead of whole function implementation makes sense. As an example, instead of using the standard Haversine formula to calculate distance between two points on Earth's surface, the distance computation API of Google Maps can be used for better results.

g) External Tools:—Off-loading computation to external tools, containing well tested function implementations is another approach. For example, statistical calculations may be loaded to a statistical tool like 'R' and the results fetched back.

In the present exemplary embodiment, a J2EE based system was developed and an Apache Jena was used as the SPARQL engine. If a user wants to add a function say 'isNorthWestOf', then the user 240 searches a registry 222 of existing functions. The registry 222 is a code base of the functions that the user 240 may use for querying. The code base may contain a) standard functions, b) defined functions, and c) shared functions. The user 240 needs to turn on the functions that the user 240 wishes to use. The user 240 may remove and update self-created functions. If the desired function does not exist, the user 240 may add to the registry. If the desired function does exist, but some logic needs to be changed for application specific requirements, it may be done by overriding the function for that user 240.

The FIG. 3 showcases the front-end screen where a Java code is either typed or pasted and the same is added after validation to the SPARQL library. Further, in FIGS. 6 and 7, the present embodiment is illustrated in detail through various steps carried out for the system 102. If the desired function does not exist in the registry 222, the user 240 may add the function by tagging the 'main' method in case of multiple functions in code body. Then the code is added to the SPARQL library for immediate use, and the same may be shared with other users for use. Finally the user 240 visualizes the result in an appropriate form.

In another example is explained below considering the user 240 wants to calculate median of temperatures in Indian cities by running a well formed SPARQL query on semantically linked data. But the user 240 finds no "median" function in SPARQL library list of functions. Then the user 240 may type the function and re-uses sort( ) function already entered in the system by some other user (he has found it by searching list of available functions in the library function listing). The code typed by the user 240 is shown below:

```
public static double median(double[ ] m) {
sort(m); // re-using library function
int middle = m.length/2;
if (m.length%2 == 1) {
return m[middle];
} else {
    return (m[middle-1] + m[middle]) / 2.0;
}                                            }
```

Further, the user may add the function "median" and the system does the internal integration with the SPARQL query. The user runs the below query Q successfully.

```
select median(?value) where
  { ?city <cityHasSensor> ?temperature.
    ?temperature <hasTemperatureValue> ?value.
    ?city <cityOfCountry> "India"}
```

The result of the above query Q is shown to the user as 25.30 C/77.540 F. The system 102 may support different visualization modes and unit conversions of results for ease of the user 240. In this case based on the URI of temperature it is identified what the unit of the values will be based on internal mapping.

Figure 15:
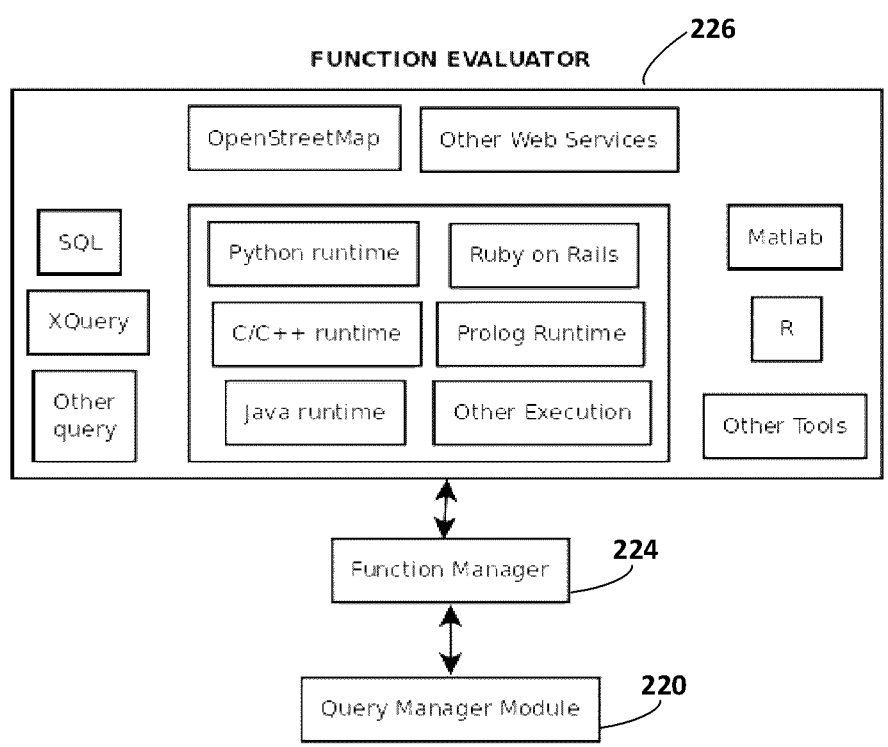
FIG. 15 illustrates a detail explanation of the function evaluator module of the system, in accordance with an embodiment of the present disclosure.

Referring now to FIG. 15, the function evaluation module 226 is explained in detail by considering the above query Q. When the query parser in query manager module 220 detects an external function (in Q it is "median") then, it checks with function manager 224 where to pass the control in between query evaluation. The function manager then passes the control to the apt function evaluator module 226 (in this case Java Runtime where the .Class file is loaded if not in memory and "median" over data points evaluated.
Query: select median(data points)→"median" function term parsed→function exists in Java Runtime→evaluate Java-.median(data points)→pass the computed value to query: select Value.
If the function "median" was written in C, then control should have gone to C runtime for evaluation. Further, there may be various categories of function evaluation which are as follows:
  a) Programming Language Library implementations—Java, C, etc. Example—median(?temp)>10
  b) Web Services—like OpenStreetMap where computations can be done on an external server Example—osm:distanceBWcities(?city1, ?city2)>10
  c) External Tools—like R Script, where functions are available packaged with the tool. Example—r:corrcoeff (?height, ?weight)>0.5
  d) Query Evaluation—like SQL, XQuery such that hybrid queries are possible. Example—sql:(select count(employee) from EmployeeTable2)<30

For each of the above categories, a wrapper may be needed to enable communication with external evaluator. Further, another functionality of the function evaluator module 226 may be to validate whether a function at time of addition/modification actually executes correctly. This becomes a part of one of the steps of validation, namely runtime validation (checking for errors that creep at running the function) and functionality testing (whether the function produce desired output given a sample data whose output is beforehand known, like a sorted array: 2,4,6,1→1,2,4,6 (i/p, o/p). Further, the another functionality may be storing different evaluation metrics like space and time complexity to be used by learning module of the system 102 to do analytics as well as showing the information at the time of function search or selecting functions for a query. The frequently used functions as determined by the analytics module may be loaded in the execution environment i.e., function evaluator for fast execution in future. The frequently used functions may be suggested to the standards committee for inclusion in the internal SPARQL library.

According to embodiments of present disclosure, the other functionalities of the system 102 are explained in subsequent paragraphs of the specification.

Integration of Other Query Languages

The SPARQL is the standard language to query on semantically linked data in RDF format. However, data exists in various forms. So enabling integration of the SPARQL queries with other query languages like SQL for relational database and XQuery for XML data will lead to a much wider scope of queries. The query Q can be re-written based on data source:

```
select median(?value) where {
?city <cityHasSensor> ?temp.
?temp <hasTemperatureValue> ?value.
sql:(select ?city from MetroCityTable)}
```

The above format may be parsed to break the queries and evaluate in SQL engine with its data source connected (in this case the relational table named MetroCityTable from a pre-defined database) and then processed by the SPARQL engine. In this way, the intermediate conversion from structured relational data to RDF is also not required as they are linked independently.

Nested Functions

In this feature, query functions may be written in the form of "a(b( )$c( )", where a, b, and c are functions and $ is some operator. For example, median (abs(?value) mod 20). It is to be noted that while typing the query auto-suggestions may be provided that will help in function selection.

Performance Estimate

Apart from the data gathered when a function, for example, "mean" function runs on a set of data points, doing code analysis, the expected runtime and space requirements can be predicted that will aid the user in selection of a function implementation among several implementation types. For example, functions written in C programming language are expected to take less space compared to Java, due to Java's object heap requirements Aggregate Queries There may be two types of functions i.e., one pass function and aggregate functions. For example, the one pass functions may be like prime (no.) that takes a number and returns the result. For example, the aggregate functions may be like median (data points) that work on many data points either incrementally or at one pass. So for aggregate functions, the query can be evaluated as follows:

```
Q': select median(?temp) where {
    ?city <cityHasTemperature> ?temp.}
Q": ResultSet <= select?temp where { ?city <cityHasTemperature> ?temp.}
    Final result <= median(ResultSet)
```

From the above example, it may be seen that the query Q' may get transferred into Q" as a broken evaluation.

Handling Changes in External Service and Tools

It may happen that an external service like some web service based computation engine's API interface changes. Hence, there is frequent polling to seek if existing integrated functions return correct results or not. Also runtime failures may be also noted and alerts triggered. A concerned developer needs to change the interface with the service APIs so that the functions can work again. In case of tools, the change may be in the hand of administrator of system unlike web services. If a new version of tool launches with more functionality, the same has to be made by the concerned developer team of the system. The system will then carry out an exhaustive testing of the new updated or re-integrated functions with priority of evaluation given to frequently used functions. In case of tools, a backward compatible version of function may also be kept if stability is an issue.

Duplicate Function Implementations

The function names play an important role as the library search is based on names and while forming the query, suggested names come down as hint needs to be distinct and informative enough to help the user make a choice. So a URI is attached to each function of the format as "[evaluation environment] [parameter data type] [name]".

For example, "http://c/a/i/median", where C is the environment where function is available and "a/i" denotes the input type is an array of integers. As can be understood, a mapping of function URIs meanings is kept for looking up the apt function in the registry by the function manager. So, "http://c/a/i/median" and "http://p/a/d/median" are 2 different functions, the first one being of C on integer array and another on Python on double array. For example, http://c/a/n/median will mean that it can handle all numerical (n) values. Similar meaningful notations may be used according to other embodiments of the present disclosure.

Further, a lexical database and ontology may be maintained that helps in finding similar functions with different names. For example, 'Average' and 'Mean' are names of functions that do the same thing. Also conceptually similar functions are grouped together, for example, Mean, Median and Mode, is shown to the user when user searched for a particular function name among them.

Further, it may happen that developers have implemented the same function in different ways as there may be more optimal ways to write code for the same function implementation. In that case the convention to be followed is [evaluation environment] [parameter data type] [name] [id] [version]. Here, the "id" is the user id, and version no. gives modified code bodies or new code altogether. For example, http://c/a/i/median/2/14 and http://c/a/i/median/2/8 are different code versions of same user, while http://c/a/i/median/3/14 may be a totally different code of a different user.

When the functions are displayed, ranking is applied based on developer/user rating, least recently modified, performance metrics, and closeness to the data type under consideration in query body. There may be logical code checking (not just string checking) so that even if different variable names are there, duplicates can be found. This can be done by replacing variable names with uniquely numbered names and template variations with a common template. These duplicate alerts may be trigged when the user wants to add a new code which already exists in the system logically. As a result, space in the system is reduced. However the user is free to choose and edit the duplicate code with good variable names and comments if the user wants that. Further, the system will then again do a comparison to check if logic has been changed or not. The below code snippets are duplicates.

Code 1: int test (int x){x=x+1; return x;}
Code 2: int test2(int a){a++; return a;}

Further, the another optimal usage is when the execution environment of C is overloaded, then if a similar function exists in Python environment which is less loaded, the same can be used for evaluation.

Figure 16:
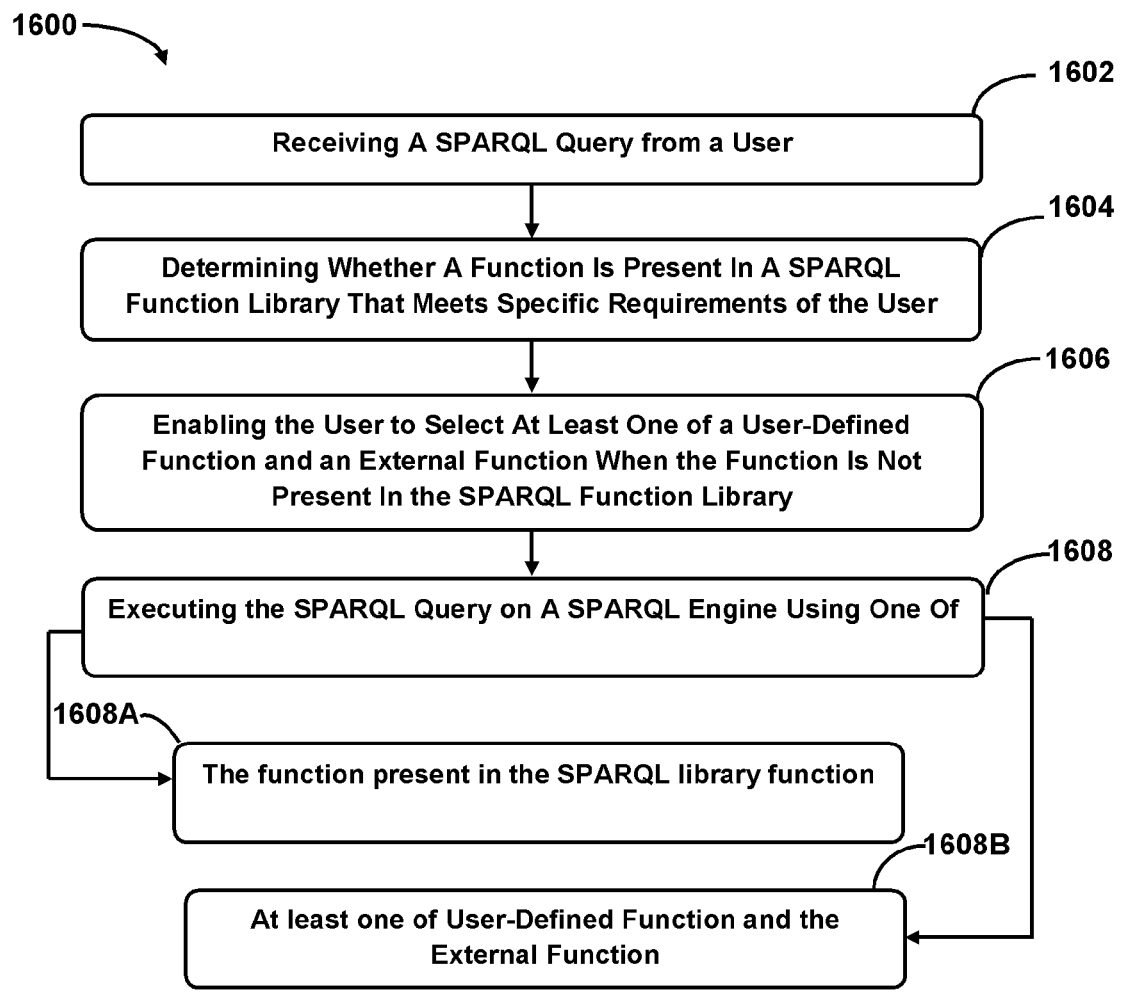
FIG. 16 illustrates the method for the SPARQL Library management, in accordance with an embodiment of the present disclosure.

Referring now to FIG. 16, a method 1600 for the SPARQL Library management, in accordance with an embodiment of the present disclosure. The method 1600 may be described in the general context of computer executable instructions. Generally, computer executable instructions can include routines, programs, objects, components, data structures, procedures, modules, functions, etc., that perform particular functions or implement particular abstract data types. The method 1600 may be practiced in a distributed computing environment where functions are performed by remote processing devices that are linked through a communications network. In a distributed computing environment, computer executable instructions may be located in both local and remote computer storage media, including memory storage devices.

The order in which the method 1600 is described is not intended to be construed as a limitation, and any number of the described method blocks can be combined in any order to implement the method 1600 or alternate methods. Additionally, individual blocks may be deleted from the method 1600 without departing from the spirit and scope of the disclosure described herein. Furthermore, the method can be implemented in any suitable hardware, software, firmware, or combination thereof. However, for ease of explanation, in the embodiments described below, the method 1600 may be considered to be implemented in the above described in the system 102.

At block 1602, a SPARQL query may be received from a user. The SPARQL query received may be linked with a specific requirement of the user.

At block 1604, it may be determined whether a function is present in a SPARQL function library that meets the specific requirements of the user.

At block 1606, the user may be enabled to select at least one of a user-defined function and an external function when the function is not present in the SPARQL function library. Further, the user-defined function and the external function may correspond to a programming language other than a SPARQL query language. Further, the at least one of the user-defined function and the external function may be instantly integrated into the SPARQL function library.

At block 1608, the SPARQL query may be executed on the SPARQL engine using one of the options described in the blocks 1608A and 1608B.

At block 1608A, the SPARQL query is executed on the SPARQL engine using the function present in the SPARQL library function.

At block 1608B, the SPARQL query is executed on the SPARQL engine using the least one of the user-defined function and the external function.

Although implementations for methods and systems for executing the SPARQL query on a SPARQL engine have been described in language specific to structural features and/or methods, it is to be understood that the implementations and/or embodiments are not necessarily limited to the specific features or methods described. Rather, the specific features and methods are disclosed as examples of implementations for the executing the SPARQL query on a SPARQL engine.

Exemplary embodiments discussed above may provide certain advantages. Though not required to practice aspects of the disclosure, these advantages may include those provided by the following features.

Some embodiments enable a system and a method that allows dynamic or on-the-fly extension of the SPARQL in contrast to earlier option of editing through manual integration.

Some embodiments enable a system and a method that allows ordinary users to add functionality to the SPARQL.

Some embodiments enable a system and a method that facilitates strategies to share common functions among applications for reusability and meeting resource constraints.

Some embodiments enable a system and a method that allows an integration of code copied from internet or some other source which may be in different languages.

Some embodiments enable a system and a method that facilitates provision for user defined functions to be shared, rated, and extended on platform, thereby enriching the SPARQL library in-built with the SPARQL engine.

Some embodiments enable a system and a method that facilitates provision for the search functionality for the functions.

Some embodiments enable a system and a method that allows the validation of user defined functions.

Some embodiments enable a system and a method that allows the chaining of the functions to define a new function.

Some embodiments enable a system and a method allows performing the analytics on the function base through the time and the space requirements, the frequency of usage, the modification, and extension and other details.

Some embodiments enable a system and a method allows the user to select the appropriate function based on the analytics presented to the user.

Some embodiments enable a system and a method to enable the external tools and the web services integration for the functionality extension.

We claim:

1. A method for executing a Simple Protocol and Resource Development Framework (RDF) Query Language (SPARQL) query on a SPARQL engine, the method comprising:

receiving, by a processor, a SPARQL query from a user, wherein the SPARQL query is linked with a specific requirement of the user;

determining, by the processor, a status of a function in a SPARQL function library, wherein the status comprises a presence of the function or an absence of the function;

enabling, by the processor, the user to:
  i. check whether the function meets the specific requirement of the user when the status indicates presence of the function, and
  ii. check whether a separate function of similar functionality is required to meet the specific requirement of the user when the status indicates absence of the function, and
  iii. select at least one of a user-defined function and an external function, wherein the user-defined function and the external function correspond to a programming language other than a SPARQL query language, and wherein the at least one of the user-defined function and the external function is instantly integrated into the SPARQL function library; and executing, by the processor, the SPARQL query, on the SPARQL engine, using one of:
  the function present in the SPARQL library function, or
  the at least one of the user-defined function and the external function.

2. The method of claim 1, further comprising enabling the user to request for the function by typing name of the function.

3. The method of claim 2, further comprising suggesting one or more functions based on the name of the function requested by the user and the specific requirement of the user, wherein the one or more functions are present in the SPARQL function library, and wherein the one or more functions and the function requested by the user have a similar functionality.

4. The method of claim 1, wherein the at least one of the user-defined function and the external function comprises a metadata further comprising function id, rating, time and space coordinates, associated developer, and last modified, and wherein the at least one of the user-defined function and the external function comprises a set of software code.

5. The method of claim 1, further comprising performing a static validation, compilation validation, run-time validation, and a black box testing for the at least one of the user-defined function and the external function, and wherein the:

static validation comprises static analysis of the set of software code, performing syntax error check, and coding errors check, compilation validation comprises performing a check to verify whether the set of software code is compiled, run-time validation comprises performing a check for any run-time errors in the set of software code using a test input, and black box testing is performed based on user's input.

6. The method of claim 1, further comprising enriching the SPARQL function library by inclusion of highly rated functions, wherein the functions are rated by the user on a basis of operability for other data types.

7. The method of claim 1, further comprising enriching the SPARQL function library, wherein output of one function is passed as input to another function.

8. A system for executing a Simple Protocol and Resource Development Framework (RDF) Query Language (SPARQL) query on a SPARQL engine, wherein the system comprises:
- a processor; and
- a memory coupled with the processor, wherein the processor executes a set of instructions stored in the memory to:
  - receive a SPARQL query from a user, wherein the SPARQL query is linked with a specific requirement of the user;
  - determine, by the processor, a status of a function in a SPARQL function library, wherein the status comprises a presence of the function or an absence of the function;
  - enable the user to:
    - i. check whether the function meets the specific requirement of the user when the status indicates presence of the function,
    - ii. check whether a separate function of similar functionality is required to meet the specific requirement of the user when the status indicates absence of the function, and
    - select at least one of a user-defined function and an external function, wherein the user-defined function and the external function correspond to a programming language other than a SPARQL query language, and wherein the at least one of the user-defined function and the external function is instantly integrated into the SPARQL function library; and
  - execute, by the processor, the SPARQL query, on the SPARQL engine, using one of:
    - the function present in the SPARQL library function, or the least one of the user-defined function and the external function.

9. The system of claim 8, further enables the user to request for the function by typing name of the function.

10. The system of claim 9, further suggests the one or more functions based on the name of the function requested by the user and the specific requirement of the user, wherein the one or more functions are present in the SPARQL function library, and wherein the one or more functions and the function requested by the user have a similar functionality.

11. The system of claim 8, wherein the at least one of the user-defined function and the external function comprises a metadata further comprising function id, rating, time and space coordinates, associated developer, and last modified, and wherein the at least one of the user-defined function and the external function comprises a set of software code.

12. The system of claim 8, further performs a static validation, compilation validation, run-time validation, and a black box testing for the at least one of the user-defined function and the external function, and wherein the:
- static validation comprises static analysis of the set of software code, performing syntax error check, and coding errors check,
- compilation validation comprises performing a check to verify whether the set of software code is compiled,
- run-time validation comprises performing a check for any run-time errors in the set of software code using a test input, and
- black box testing is performed based on user's input.

13. A non-transitory computer readable medium embodying a program executable in a computing device for executing a Simple Protocol and Resource Development Framework (RDF) Query Language (SPARQL) query on a SPARQL engine, the program comprising:
- a program code for receiving a SPARQL query from a user, wherein the SPARQL query is linked with a specific requirement of the user;
- a program code for determining a status of a function in a SPARQL function library, wherein the status comprises a presence of the function or an absence of the function;
- a program code for enabling the user to:
  - i. check whether the function meets the specific requirement of the user when the status indicates presence of the function,
  - ii. check whether a separate function of similar functionality is required to meet the specific requirement of the user when the status indicates absence of the function, and
  - select at least one of a user-defined function and an external function, wherein the user-defined function and the external function correspond to a programming language other than a SPARQL query language, and wherein the at least one of the user-defined function and the external function is instantly integrated into the SPARQL function library; and
- a program code for executing the SPARQL query, on a SPARQL engine, using one of:
  - the function present in the SPARQL library function, or the least one of the user-defined function and the external function.

* * * * *

UNITED STATES PATENT AND TRADEMARK OFFICE
CERTIFICATE OF CORRECTION

PATENT NO. : 9,898,502 B2
APPLICATION NO. : 14/793199
DATED : February 20, 2018
INVENTOR(S) : Banerjee et al.

It is certified that error appears in the above-identified patent and that said Letters Patent is hereby corrected as shown below:

In the Drawings

Sheet 2 of 13 (Reference Numeral 220, Figure 2) at Line 1, Change "OUERY" to --QUERY--.

Sheet 7 of 13 (Figure 7) at Line 5 (approx.), Change "SPAQL" to --SPARQL--.

In the Specification

In Column 4 at Line 51, After "system" insert --.--.

In Column 10 at Line 28, After "deviation" insert --.--.

In Column 15 at Line 5, After "requirements" insert --.--.

Signed and Sealed this
Twenty-fourth Day of July, 2018

Andrei Iancu
*Director of the United States Patent and Trademark Office*